United States Patent [19]
Teter

[11] 3,813,173
[45] May 28, 1974

[54] DEFECT SENSING APPARATUS AND METHOD

[75] Inventor: Michael P. Teter, Horseheads, N.Y.

[73] Assignee: Corning Glass Works, Corning, N.Y.

[22] Filed: Feb. 22, 1972

[21] Appl. No.: 228,170

[52] U.S. Cl.............................. 356/239, 350/162 SF
[51] Int. Cl............................................... G01c 1/06
[58] Field of Search................ 356/239; 350/162 SF

[56] References Cited
UNITED STATES PATENTS
3,658,420   4/1972   Axelrod............................... 350/162

Primary Examiner—William L. Sikes
Attorney, Agent, or Firm—Charles W. Gregg

[57] ABSTRACT

Apparatus for and method of sensing or detecting defects such as so-called pin holes in transparent thin films which are deposited on a surface of a transparent substrate either originally in the form of a thin film microcircuit pattern or for the subsequent purpose of making a microcircuit pattern out of a deposited film covering the entire surface of the substrate. The substrate and its film are illuminated by a collimated source of white or suitably filtered light and are imaged or focused through a first lens system or Fourier transform lens at a point on one side of a light trap or dark field stop. When the thin film is in the form of a microcircuit pattern, a negative of a Fourier transform of a defect-free microcircuit identical in pattern to the pattern imaged through the transform lens is required to be used as the light trap or dark field stop. However, when the thin film covers the entire surface of the substrate a conventional or basic form of light trap may be used. A defect such as a pin hole in the illuminated film diffracts the light rays passing through the pin hole and these rays are imaged or focused through a second lens system at a point in an image plane in advance of the lens of a vidicon tube or television camera. A rotating filter preferably comprising a transparent disk having on selected alternate segments of one face thereof a thin film of the same material as the film on the substrate, or a film of similar light absorbing characteristics, is disposed between the image plane and the camera lens. The arrangement causes flashing on and off of the images of pin holes in the thin film on the substrate while images of other defects such as dust or finger prints on the substrate remain steadily on. Various modifications of the rotating filter are possible or practicable.

15 Claims, 3 Drawing Figures

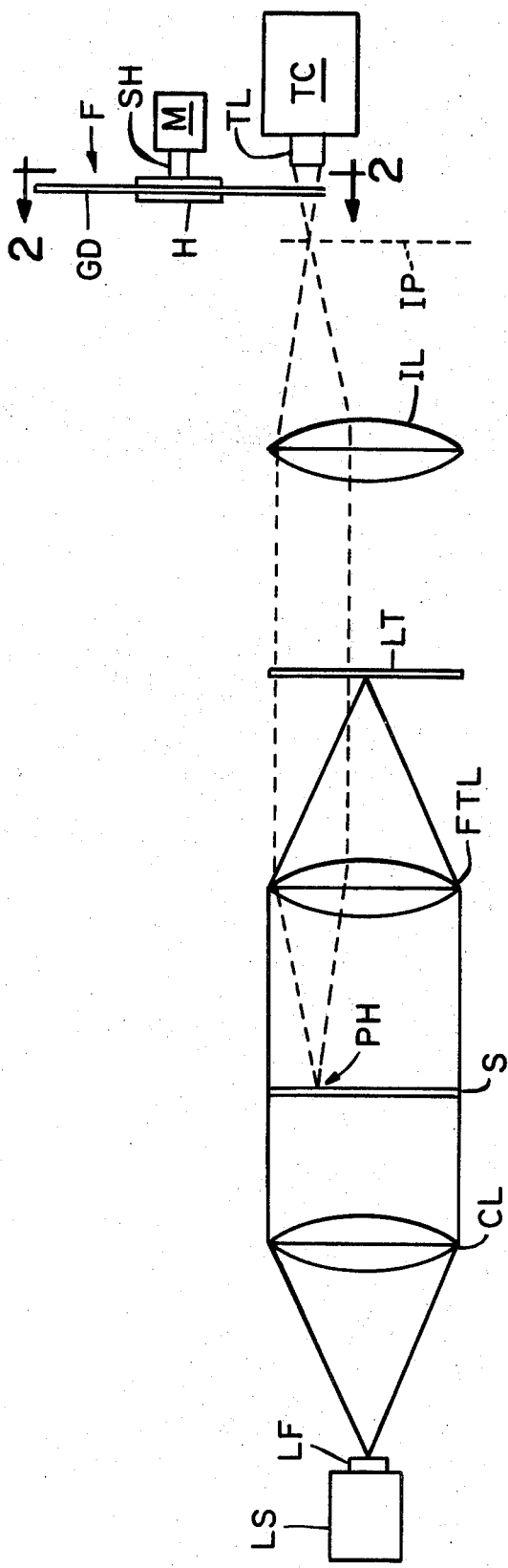
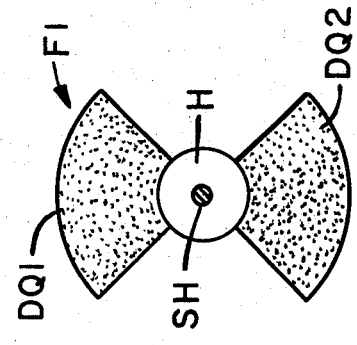
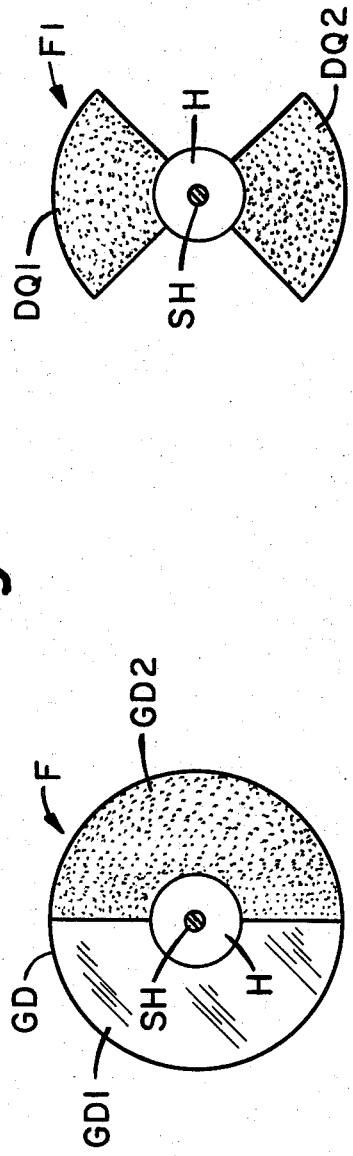

DEFECT SENSING APPARATUS AND METHOD

BACKGROUND OF THE INVENTION

Thin films are often deposited on substrates for the purpose of so-called chemically machining (etching) of integrated circuits or microcircuit patterns in such thin films. The substrates employed under such conditions are usually formed of glass due to its resistance to etching by the etchants generally used in said chemical machining and its electrical insulating properties. So-called pin holes sometimes occur in said thin films and provide a problem in the manufacture of said integrated or microcircuits because the pin holes may cause interruptions in circuit continuity of the integrated or microcircuits, or may cause increases in electrical resistance of circuit paths in which the pin holes exist, etc. These problems are well known to those skilled in the art of manufacturing integrated or microcircuits. When such a circuit is made from a thin chromium film deposited on a glass substrate there is very little problem in sensing or detecting pin holes in the thin chromium film because such a film is opaque and pin holes in such film can be detected by simple light box inspection. However, when the film is a substantially transparent film, such as an alpha iron oxide film for example, a more difficult problem arises because with such films the light box inspection method is not practical due to said transparency. The problem of detecting pin holes in transparent films is, therefore, believed readily apparent.

There is shown in U.S. Pat. No. 3,614,232, issued Oct. 19, 1971 to Einar S. Mathisen, a system for detecting or sensing defects in microcircuit patterns by illuminating the pattern with monochromatic collimated light. It is disclosed in said patent that a vidicon tube or television camera can be used for display of defects in microcircuit patterns. However, the defect sensing apparatus of such patent cannot distinguish, as in the present application, between defects such as pin holes, and other defects such as dust and fingerprints, because the apparatus of the patent uses a source of monochromatic collimated light for illuminating purposes.

Carlyle S. Herrick et al. U.S. Pat. No. 3,317,736, which issued May 2, 1967, covers an apparatus for measuring the probability of the presence of optical blemishes in a moving web and particularly in a moving web of film to be employed in the production of thermoplastic tape to be used as a high resolution recording medium which is projected through a dark field optical system. The apparatus of the patent to Herrick et al. uses a source of light which is apparently an incandescent source, that is, which is apparently a source of white light, for illuminating the web or tape for the purpose of sensing or detecting optical blemishes in such web or tape in a manner somewhat similar to that of Mathisen and that of the present application. However, Herrick et al. does not show or teach the use of white light to distinguish different types of defects or blemishes as in the invention of the present application. It is, therefore, an object of the present invention to provide an apparatus for and method of sensing or detecting defects or blemishes in thin films deposited on substrates and for distinguishing between certain types of the defected defects or blemishes.

Other objects and characteristic features of the invention will become apparent as the description proceeds.

SUMMARY OF THE INVENTION

It is believed that an adequate summary of the invention is set forth in the preceding abstract of the disclosure and, therefore, for purposes of preventing redundancy or repetition, and in order to make the specification as concise as possible without sacrifice of clarity and exactness, no further broad summary of the invention is considered necessary.

BRIEF DESCRIPTION OF THE DRAWINGS

In the drawings:

FIG. 1 comprises a generally simplified schematic drawing of the basic embodiment of the apparatus of the invention;

FIG. 2 is a view of a component of the apparatus of FIG. 1, such view being taken generally along line 2—2 of FIG. 1; and FIG. 3 is a view showing one alternative embodiment of the component shown in FIG. 2.

Similar reference characters refer to similar parts in each of the Figs. of the drawings.

PREFERRED EMBODIMENT OF THE INVENTION

Referring to the drawings in detail, there is shown in FIG. 1 a source of white light designated LS which may, for example, include a mercury arc lamp and preferably also a light filter LF which transmits light that is mostly blue but contains some red. The light rays from source LS and transmitted through said filter are further transmitted to collimator lens CL. The rays pass through such lens and are transmitted therefrom in a collimated form as illustrated in FIG. 1. Such collimated rays illuminate a transparent substrate S, such as a glass substrate for example, which has deposited on one face thereof a transparent thin film. Such thin film may, for example, be a transparent alpha iron oxide film which is deposited on a face of substrate S such as by sputtering for example. Sputtering techniques for deposition of thin films on substrates are well known in the art.

Referring further to FIG. 1, the collimated rays of light which are transmitted from lens CL and which illuminate substrate S pass through such substrate and its transparent film without diffraction of any of the rays when said film does not have any defects, blemishes or pin holes etc. Said collimated rays of light are transmitted to a Fourier transform lens or first lens system designated FTL and, when the thin film covers the entire surface of substrate S, such rays pass through such lens and are focused at a point on the near side of a light stop or trap LT which blocks continued passage of the rays of light. The similarity between the thus far described apparatus of the present invention and the corresponding apparatus of the previously cited patent to C. S. Herrick et al. will be readily apparent from the foregoing description of Applicant's apparatus and a brief study of the apparatus of such patent. If, as previously mentioned, the thin film on substrate S is in the form of a thin film microcircuit pattern, a light stop which includes substantially the negative of a Fourier transform of such pattern or microcircuit, and which is error or defect-free, is used as light stop or light trap LT. Light trap or stop LT is, therefore, shown in FIG. 1 of the drawings as being of a size corresponding to that of substrate S. The purpose of the use of a Fourier transform as the light stop or trap LT in place of a basic or conventional type of light trap will be readily apparent to those skilled in the art. If more information relative to Fourier transforms and their use as light stops or traps is desired, reference is made to the previously cited patent to E. S. Mathisen.

It will now be assumed that a pin hole, such as designated by the reference character PH in FIG. 1, exists in the transparent film or microcircuit pattern on substrate S. Under such conditions, any ray or rays of the collimated rays of light which are transmitted to said pin hole from lens CL are diffracted when they pass through such hole and take a path such as indicated by the broken lines in FIG. 1, for example, as is well known in the art. These diffracted rays are transmitted to said first lens system or lens FTL, as illustrated, and pass through such lens and are then transmitted as a second group of collimated rays to a second lens system comprising an image or collector lens designated IL. This second group of rays pass through lens IL and are focused by such lens at a point in an image plane indicated at IP as illustrated in FIG. 1. Such rays are further transmitted through said point towards the lens TL of a light responsive display means such as a vidicon tube or television camera. However, in the apparatus of the present invention illustrated in FIG. 1 a rotating filter F is interposed between said focal point in image plane IP and lens TL for purposes discussed below.

When Fourier filtering is used to obtain contrast embodiment as in the present invention, blemishes or imperfections on the exposed surface of substrate S, and/or on the exposed surface or in the thin film on such substrate for example, diffract the light in a manner similar to the previously mentioned pin hole PH in said film. Such blemishes or imperfections may, for example, be in the form of dust, fingerprints etc. and shown up as bright spots similar to that caused by a pin hole such as PH. However, blemishes such as dust or fingerprints etc. do not harm thin film microcircuits nor impair the use of a thin film coated substrate for the manufacture of integrated circuits or microcircuits and, therefore, in the sensing or detection of defects such as pin holes in the microcircuit patterns or thin films, it is of course desirous that the bright spots caused by such defects and the location of such defects be distinguishable from bright spots caused by blemishes of the type mentioned so that time is not wasted in determining whether the bright spots are a result of pin holes or similar intolerable defects or are merely a result of dust, fingerprints etc. The present invention was developed for such purpose.

The light of the bright spots caused by the blemishes or imperfections such as dust or fingerprints differs in color from the light which passes through pin holes such as PH because the first mentioned light must pass through the film or substrate S and, therefore, differs in color from the pin hole light. As an example, an alpha iron oxide thin film, such as the thin film on substrate S, may be approximately one-tenth percent transparent to ultraviolet wavelengths and as much as seventy percent transparent to wavelengths of the visible spectrum. In other words the film on substrate S will substantially absorb the wavelengths of visible light adjacent the ultraviolet end of rays of light from a source of white light (the blue light) and will substantially transmit the wavelengths of visible light adjacent the infrared end of rays of light from such source of white light (the red light). For this reason, it is preferable that the filter in light source LS be provided to transmit mostly blue light as previously mentioned. Such light is transmitted through substrate S to an appreciable degree only where a pin hole such as PH exists in a thin film which is provided on the entire surface of substrate S, for example. The light passing through imperfections or blemishes such as dust or fingerprints etc. on substrate S or said thin film on such substrate and diffracted by such imperfections or blemishes is substantially red light. Thus, in order to distinguish between the bright spots caused by pin holes or similar defects in a thin film on substrate S and the bright spots caused by blemishes such as fingerprints or dust on such substrate, a suitable filter is provided as discussed below.

Filter F shown in FIGS. 1 and 2, and filter F1 shown in FIG. 3 illustrate two embodiments of filters which may be used in the present invention. Filter F comprises a transparent disk GD having a plurality of equal alternate segments which are, alternately, coated or provided with a thin film or no film as will be readily apparent. For purposes of simplification, disk GD is shown as comprising only two segment GD1 and GD2 which are uncoated and coated segments, respectively. Disk GD is preferably made out of the same transparent material as the previously discussed substrate S and the thin film deposited on segment GD2 is preferably of the identical material as that deposited on said substrate. Disk GD is supported for rotation by a hub H on the output shaft SH of a suitable motor M and the disk protrudes into the path of the light rays transmitted between the previously mentioned focal point in image plane IP and lens TL of tube or camera TC. Such arrangement will be readily apparent from a brief glance at FIG. 1 of the drawings. Filter F1 shown in FIG. 3 comprises two oppositely disposed disk quadrants DQ1 and DQ2 which are also preferably made of the same transparent material as substrate S and each of which is provided with a thin film of a material complementary and preferably identical to that provided on substrate S. When used, filter F1 is rotatably supported in a manner similar to that shown for filter F in FIG. 1 and filter F1 can, of course, be used in place of filter F.

OPERATIONAL EXAMPLE OF THE INVENTION

In using the apparatus of the invention, a substrate such as S having a thin film microcircuit on one surface thereof, or a thin film covering an entire surface of the substrate, is positioned in the path of the collimated light rays transmitted from collimator lens CL towards Fourier transform lens FTL. As previously discussed, such light rays pass through substrate S and the thin film thereon and any of the light rays passing through a pin hole such as PH or through other types of blemishes such as specks of dust or fingerprints are diffracted as also previously described. Passage of the undiffracted background light rays is substantially hindered or blocked by light trap or Fourier transform LT while the diffracted light rays are substantially transmitted past such light trap to image or collector lens IL and thence through image plane IP to filter F (or F1 is used).

Assuming that motor M is, at first, not energized, the rays of light transmitted to filter F will pass through such filter and will or will not be filtered accordingly as semicircular segment GD2 and GD1, respectively, is then in the transmission path of the light rays. If the uncoated segment GD1 of disk GD is in such path the light rays are transmitted to lens TL of camera or tube TC without filtering and the images of the pin hole PH and of any blemishes such as dust or fingerprints on substrate S will all appear as bright spots. However, if their film coated segment GD2 of disk GD is in said transmission path, the blue rays from pin hole PH will be substantially absorbed by said thin film and no bright spot corresponding to the pin hole will appear. However, the red light rays from the dust particles or other similar blemishes on substrate S will be transmitted through the thin film on disk segment GD2 and still appear as bright spots. If motor M is now energized to impart rotation to disk GD, the transmittance of the rays of light from pin hole PH will be intermittently interrupted accordingly as disk segment GD1 or GD2 is passing in front of lens TL. This will cause blinking of the bright spot from pin hole PH while the bright spots from the dust particles or other similar blemishes will remain steadily on. This is believed readily understood from the foregoing description.

If a filter such as F1 is used in place of filter F, operation similar to that described above will result since the open spaces between disk segments DQ1 and DQ2 take the place of disk segment GD1 of filter F. It is readily apparent, however, that at the same speed of rotation of filters F and F1, the bright spot due to pin hole PH will blink on and off twice as often when filter F1 is used as when filter F is used. The frequency of blinking of the pin hole PH bright spot can, of course, be varied either by varying the speed of rotation of motor M, or by providing filters with different numbers of alternate coated and uncoated segments, or by a combination of both such methods as is believed obvious.

It is pointed out that the filters such as F or F1 could be filters comprising alternate segments having thin films which substantially absorb red light and substantially transmit blue light. Under such conditions the aforesaid bright spot caused by pin hole PH would remain steadily on and the bright spots caused by dust and fingerprint blemishes etc. would blink, or flash on and off. It is further pointed out that, although the invention is specifically discussed in conjunction with a substrate having a transparent thin film of alpha iron oxide thereon, either as a continuous film or a film in a microcircuit pattern the invention is just as well adaptable to substrates having other transparent thin films such as, for example, a thin film which substantially absorbs red light and substantially transmits blue light. Under such conditions the light filter LF, if employed, would preferably pass light rays comprising mostly red light but containing some blue light. It is also pointed out that where the term thin film is used herein such term is intended to apply to a film in the form of a microcircuit pattern as well as to a continuous film.

Although there is herein shown and described in detail only one form of apparatus embodying the invention, it will be understood that various changes and modifications can be made therein within the scope of the appended claims without departing from the purview and spirit thereof.

I claim:
1. Apparatus for sensing or detecting defects such as pin holes in a transparent thin film provided on a surface of a transparent substrate and distinguishing such defects from blemishes such as dust particles on such substrate, such thin film substantially absorbing colors of first wavelengths and substantially transmitting colors of other wavelengths, such apparatus comprising, in combination;
  A. a source of white light,
  B. light collimator means disposed in a transmittance path of light rays transmitted from said source, said substrate disposed for illumination thereof by collimated light rays transmitted from the collimator means,
  C. a Fourier transform lens disposed in the transmittance path of the collimated light rays transmitted from said substrate,
  D. a light trap disposed about a focal length from said transform lens in the transmittance path of light rays transmitted from said substrate and said transform lens for substantially blocking undiffracted light rays transmitted through said substrate,
  E. an image lens disposed in the path of transmittance of diffracted light rays transmitted from said transform lens and said light trap,
  F. movable light filter means disposed in the path of transmittance of light rays transmitted from said image lens for substantially absorbing colors either of said first wavelengths or of said other wavelengths, such means comprising at least one transparent thin film support member having on a surface thereof a transparent thin film filter,
  G. means intermittently moving said filter means into and out of the path of transmittance of light rays transmitted from said image lens, and
  H. light responsive display means disposed in the path of transmittance of light rays transmitted from said image lens and filter means,
  I. whereby a defect such as a pin hole in said thin film on said substrate will be displayed differently from blemishes such as dust particles on the substrate.

2. Apparatus in accordance with claim 1 and further including a second light filter disposed between said source of white light and said collimator means, for substantially transmitting said colors of said first wavelengths and only a selected amount of said colors of said other wavelengths.

3. Apparatus in accordance with claim 1 and in which said light trap is a Fourier transform.

4. Apparatus in accordance with claim 2 and in which said light trap is a Fourier transform.

5. Apparatus in accordance with claim 1 and in which said movable light filter means comprises at least one segment of a circle rotatable into and out of said path of transmittance of light rays transmitted from said image lens.

6. Apparatus in accordance with claim 1 and in which said transparent thin films are alpha iron oxide films.

7. Apparatus in accordance with claim 2 and in which said transparent thin films are alpha iron oxide films.

8. Apparatus in accordance with claim 3 and in which said transparent thin films are alpha iron oxide films.

9. Apparatus in accordance with claim 4 and in which said transparent thin films are alpha iron oxide films.

10. Apparatus in accordance with claim 5 and in which said transparent thin films are alpha iron oxide films.

11. Apparatus for sensing holes in a transparent thin film of alpha iron oxide deposited on a surface of a transparent substrate, such apparatus comprising, in combination, the following sequence of components;
   A. a light source including a source of white light and a filter transmitting from such source rays of blue light and a limited amount of rays of red light,
   B. a collimator lens receiving said rays from said light source,
   C. said substrate disposed for illumination by said lens,
   D. a first lens system for receiving light rays from said substrate and further transmitting the received light rays,
   E. a Fourier transform light trap disposed about a focal length from said first lens system in the path of transmittance of said light rays for substantially blocking further transmittance of undiffracted light rays transmitted from said first lens system,
   F. a second lens system for receiving diffracted light rays from said first lens system and focusing such rays at a point in an image plane,
   G. a rotatable second filter disposed beyond said point in said image plane for receiving said light rays from said second lens system and substantially absorbing either rays of said blue light or rays of said red light such filter comprising at least one transparent segment of a circle having on a surface thereof a transparent thin film filter,
   H. a television camera having its lens disposed for receiving light rays from said second filter, and
   I. motor means for rotating said second filter.

12. Apparatus in accordance with claim 11 and in which said film on said second filter is a thin alpha iron oxide film.

13. The method of sensing holes in a transparent thin film deposited on a surface of a transparent substrate such film substantially absorbing rays of one color and transmitting rays of other colors and such method comprising,
   A. illuminating said substrate and film with collimated rays of light from a source of white light,
   B. illuminating a Fourier transform lens with rays of light from said substrate and film,
   C. substantially blocking undiffracted rays of light transmitted from said transform lens,
   D. collecting diffracted rays of light transmitted from said transform lens,
   E. transmitting said collected rays of light through a point in an image plane and illuminating with the collected rays the pickup lens of a light responsive display device disposed beyond said image plane, and
   F. intermittently interposing in front of said pickup lens a transparent thin film which substantially absorbs rays either of said one color or of said other colors,
   G. whereby said display device gives one type of a display for light diffracted by holes in said thin film on said substrate and another type of display for light diffracted by other blemishes such as dust particles on the substrate.

14. The method in accordance with claim 13 and in which said transparent thin films are both thin films of alpha iron oxide.

15. The method in accordance with claim 13 and in which said one color is blue.

* * * * *